United States Patent [19]

Schartmann

[11] 3,790,720

[45] Feb. 5, 1974

[54] DIGITAL DECODER FOR MULTIPLE FREQUENCY TELEPHONE SIGNALLING

[75] Inventor: Knut Roger Schartmann, Montreal, Quebec, Canada

[73] Assignee: Northern Electric Company Limited, Montreal, Quebec, Canada

[22] Filed: Oct. 27, 1972

[21] Appl. No.: 301,506

[52] U.S. Cl. ............... 179/84 VF, 324/78, 329/104, 235/92, 340/171

[51] Int. Cl. ............................................ G01r 23/10

[58] Field of Search ....... 179/84 SS, 84 VF, 18 GA; 340/171 A, 171 R, 168 B, 147 F; 324/78, 78.5; 329/104; 235/92

[56] References Cited

UNITED STATES PATENTS

| | | | |
|---|---|---|---|
| 2,987,674 | 6/1961 | Shain | 324/78 |
| 3,413,449 | 11/1968 | Brown | 235/92 |
| 3,704,414 | 11/1972 | Herbst | 324/78.5 |
| 3,543,172 | 11/1970 | Seppeler | 329/104 |

*Primary Examiner*—William C. Cooper
*Assistant Examiner*—Gerald Brigance
*Attorney, Agent, or Firm*—John E. Mowle

[57] ABSTRACT

A signal selected from a family of signals having different predetermined frequencies is identified, within predetermined frequency limits. In one embodiment a decoder of the digital type is used to decode multiple frequency telephone signalling. A filter separates two signalling frequency signals into upper and lower frequency groups. Each of the signals is counted in upper and lower group circuits and after a predetermined count, to allow for a settling time, upper and lower group timing interval signals are generated. At the end of the time interval the upper and lower group circuits cease to count. In the continuing presence of the signals the counts are decoded to identify the signalling frequency signals received. The use of digital circuitry yields a space and cost saving over previously used analogue circuitry.

6 Claims, 6 Drawing Figures

PATENTED FEB 5 1974 3,790,720

SHEET 1 OF 2

DIGITAL DECODER FOR MULTIPLE FREQUENCY TELEPHONE SIGNALLING

The present invention relates to the identification of signals within certain predetermined ranges of frequencies and more particularly to receivers of multiple frequency (MF) telephone signalling signals.

Various types of multiple frequency (MF) receivers are used in telephone switching offices to receive telephone signalling. Typically these receivers consist of a plurality of tuned amplifiers in combination with signal level sensing devices. As the frequencies of the signals being received are in the audio spectrum the typical inductor and capacitive elements in the tune amplifiers tend to be relatively large and thus account for a significant portion of the cost of such receivers. One improvement in these receivers has been to substitute gyrators, to simulate the characteristic of previously used large inductors.

It has been determined that if the MF signalling is of a type which is valid only when there is one signalling frequency present in each of two permissible groups, that is, lower and upper groups, a pair of digital circuits are economically applicable in the detection and identification of the two signalling frequencies. These circuits are preceded by squaring circuits which in turn are preceded by a low pass and a high pass filter to separate the groups of lower and upper frequency signals.

The present invention is an electronic circuit for identifying, within predetermined limits, a frequency signal selected from a plurality of predetermined frequency signals. The circuit comprises a first means for counting each cycle of the frequency signal. A second means, responsive to a predetermined count in the first means, generates a timing signal after which the first means is inhibited from counting. A third means decodes the output of the first means, after the timing signal, so that the frequency is thus identified when the count falls within a plurality of permissible count ranges.

The present invention is also a method for identifying a frequency signal selected from a plurality of distinctly different predetermined frequency signals. The method comprises the step of counting each cycle of the frequency signal, after a predetermined number of counts generating a timing signal and at the end of the timing signal terminating the counting. Finally, identifying the frequency according to the total, arrived at during the counting, if the total falls within one of a plurality of permissible count ranges.

Figure 1:
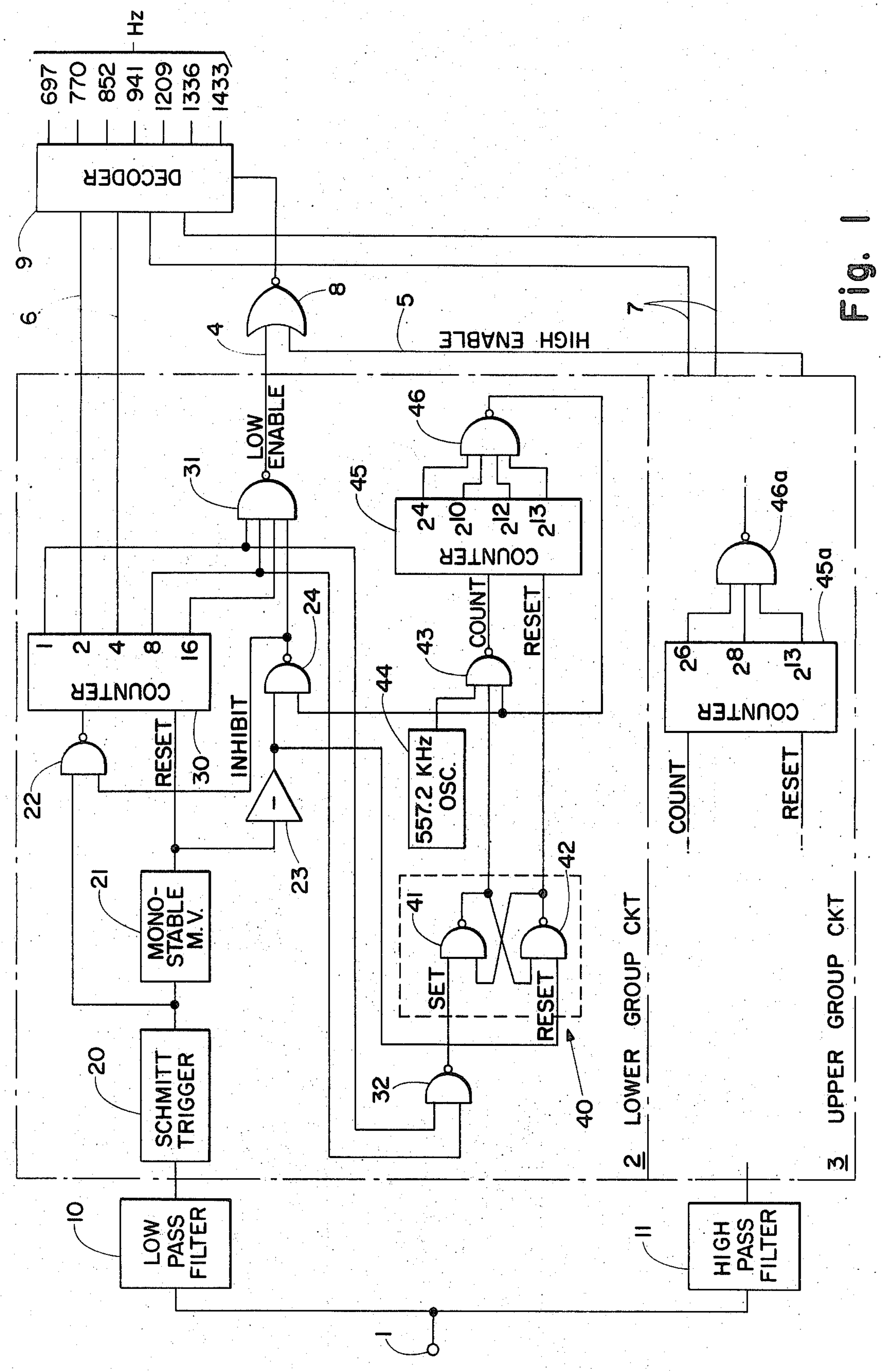

An example embodiment will now be described with reference to the accompanying drawings in which:

FIG. 1 is a schematic and block diagram of a telephone multiple frequency signalling receiver, in accordance with the invention; and FIGS. 2*a* – 2*e* are representative of waveforms found in the receiver in FIG. 1, during its operation.

Referring to FIG. 1, the circuit comprises a low pass filter 10 and a high pass filter 11 each connected between an input terminal 1 and a lower group circuit 2 and an upper group circuit 3 respectively.

The lower and upper group circuits 2 and 3 have similar output connections. Each have an enable output 4 and 5 and a pair of count outputs 6 and 7 respectively. The enable outputs are connected to a NOR gate 8 and the pairs of count outputs 6 and 7 are connected to a decoder 9. The output of the NOR gate 8 is also connected to the decoder 9. The decoder 9 has seven output leads, labelled 697Hz, 770Hz, 852Hz, 941Hz, 1,209Hz, 1,336Hz and 1,433Hz.

Generally in application the input terminal 1 is connected to a telephone transmission facility in a switching office. The output leads 697Hz–1,433Hz are connected to a register, memory or processing device, depending upon the requirements of the switching office.

In operation, during signalling, at least two signals are normally present at the input terminal 1, one having a frequency falling within the pass band of the low-pass filter 10, the other having a frequency falling within the pass band of the high-pass filter 11. Thus the one signal is connected to the lower group circuit 2 and the other signal is connected to the upper group circuit 3. The lower and upper group circuits 2 and 3 process the respective signals as will be explained in more detail later, such that if their respective frequencies fall within certain limits, output and enable signals are supplied to the decoder 9. Accordingly the decoder 9 selects two of its seven output leads 697Hz–1,433Hz, to provide a direct current indication thereon of the frequencies of the signals received.

In more detail, the lower group circuit 2 consists of a Schmitt trigger or shaping circuit 20 connected to the output of the low-pass filter 10. The output of the Schmitt trigger 20 is connected to the input of a monostable multivibrator 21 and to one input of a NAND gate 22. The output of the NAND gate 22 is connected to the counting input of a counter 30. The output of the monostable multivibrator 21 is connected to the reset input of the counter 30. The output of the monostable multivibrator 21 is also connected to an inverter 23, the output of which is connected to one input of a NAND gate 24. The output of the NAND gate 24 is connected as an inhibit input to the NAND gate 22.

The counter 30 has five output leads identified in a well known manner by their numerical significance in ascending order. The output leads of the counter 30 identified in significance as 2 and 4, correspond to the pair of count outputs 6, previously mentioned. The output leads of the counter identified in significance as 1, 8 and 16 and the output of NAND gate 24 are connected as inputs to a NAND gate 31. The output of the NAND gate 31 corresponds to the enable output 4. The output leads of the counter 30 identified in significance as 1 and 8 are also connected to the inputs of a NAND gate 32.

A one bit register 40 having SET and RESET inputs is connected to the output of the NAND gate 32 via the SET input and to the output of the inverter 23 via the RESET input. The register 40 is well known, and consists of a pair of NAND gates 41 and 42 with the output of each connected to an input of the other. The output of the NAND gate 41 is also connected to an input of a NAND gate 43. An oscillator 44, of fixed frequency, i.e. 557.2 KHz, is connected to an input of the NAND gate 43.

A binary counter 45 is connected via a COUNT input to the output of the NAND gate 43 and via RESET input to the output of the NAND gate 42. The binary counter 45 includes 14 binary counting stages and with outputs from the fifth, 11th, 13th and 14th stages (labelled in their order of significance as $2_4$ , $2^{10}$ , $2^{12}$ and $2^{13}$ in FIG. 1) connected as inputs to a NAND gate 46.

The output of the NAND gate 46 is connected to inputs of NAND gates 24 and 43.

The upper group circuit 3 is similar to the lower group circuit 2 except that a counter 45*a*, corresponding in structure to the counter 45, is connected to a NAND gate 46*a*, corresponding to the NAND gate 46, via output leads from the senventh, ninth and 14th binary counting stages, labelled $2^6$ , $2^8$ and $2^{13}$. Further, a counter corresponding to the counter 30 has an additional output lead, i.e. 32, connected to the inputs of a NAND gate corresponding to the NAND gate 31. Additionally the leads 2, 4 and 16 are connected to the input of a NAND gate corresponding to the NAND gate 32 while lead 8 is not.

This embodiment has been specifically designed to meet the requirements of a form of multiple frequency signalling commonly referred to as a TOUCH-TONE within the Bell System in the United States of America and within Bell Canada in Canada. The incoming signalling frequencies are split into high and low groups by conventional means, for example L-C filters, active filters or gyrators, to provide the low and high pass filters 10 and 11. The low and high group circuits 2 and 3 determine whether or not one of the valid seven signalling frequencies has been received by each, and provide a different output for each signalling frequency identified.

The tolerance of a signalling frequency signal generated by a TOUCH-TONE telephone set is ±1½% of a nominal frequency. Any received signal having a frequency that falls within ± 1½% of the nominal frequency must be considered valid. Tables A and B show four nominal low group frequencies and three nominal high group frequencies, respectively, used in TOUCH-TONE multiple frequency signalling applications, as well as the ±1½% tolerances.

TABLE A

| Nominal Frequency | −1½% | +1½% |
|---|---|---|
| 697 Hz | 686.545 Hz to | 707.455 Hz |
| 770 Hz | 758.45 Hz to | 781.55 Hz |
| 852 Hz | 839.22 Hz to | 864.78 Hz |
| 941 Hz | 926.885 Hz to | 955.115 Hz |

TABLE B

| Nominal Frequency | −1½% | +1½% |
|---|---|---|
| 1209 Hz | 1190.865 Hz to | 1227.135 Hz |
| 1336 Hz | 1315.96 Hz to | 1356.04 Hz |
| 1477 Hz | 1454.845 Hz to | 1499.155 Hz |

In operation timing signals originating in the counters 45 and 45*a* are synchronized with the respective incoming frequency signals.

In the lower group circuit 2, an incoming low frequency is shaped into a square wave by the Schmitt trigger 20 and is then applied to the counter 30. Shortly thereafter a timing signal generator or timer, consisting of the oscillator 44, the counter 45 and associated circuitry, is started. When a timing signal having a period of 23.92 msec for the low group frequencies, (15.28 msec for the high group frequencies) has elapsed, the counter 30 is stopped and the count it has reached is decoded in the decoder 9.

Using the above counting time interval, count 16 corresponds to the first low frequency, count 18 to the second low frequency and counts 20 and 22 to the third and fourth low frequencies respectively. For example, if there are exactly 16 counts the incoming frequency was:

$$\text{Input frequency} = \text{No. of counts/Timing interval}$$
$$= 16.0/23.92$$
$$= 668.84 \text{ Hz}$$

If the counter 30 was about to count 17 but counted less than 17 (assume an imaginary 16.99), the output of the counter 30 will still indicate 16 and in this case the input frequency was:

$$\text{Input frequency} = 16.99/23.92$$
$$= 710{,}64 \text{ Hz}$$

Thus for any incoming frequency between 668.84 Hz and 710.64 Hz a signal is provided at the output of the decoder 9 corresponding to count 16, i.e. a nominal frequency of 697 Hz. The same applies for counts 18, 20 and 22 and the results are shown in Table C.

TABLE C

| No. of Counts | Frequency Band Detected |
|---|---|
| 16 | 668.84 to 710.64 Hz |
| 18 | 752.45 to 794.25 Hz |
| 20 | 836.05 to 877.85 Hz |
| 22 | 919.66 to 961.46 Hz |

Comparing Tables C and A, the "Frequency Band Detected" of Table C is slightly larger than the frequency band generated as shown in Table A. This ensures that any generated frequency which falls within ±1½% of the nominal frequency is recognized as a valid signal.

In the same manner, the three high group frequencies are detected. Table D shows the frequency band detected for the high group and the corresponding number of counts using the 15.28 msec timing interval instead of the 23.92 msec timing interval.

TABLE D

| No. of Counts | Frequency Band Detected |
|---|---|
| 18 | 1178.01 to 1243.46 Hz |
| 20 | 1308.90 to 1374.35 Hz |
| 22 | 1439.79 to 1505.24 Hz |

In greater detail, the basic circuitry for the TOUCH-TONE decoder using the counter approach is shown in FIG. 1. The two frequency signals are generated at a telephone set and are received and separated by tbe low and high pass filters 10 and 11. Since the low and high frequency signals, after filtering, are processed separately but in the same manner, only the low frequency signal path will be described.

Figures 2A, 2B, 2C, 2D, 2E:
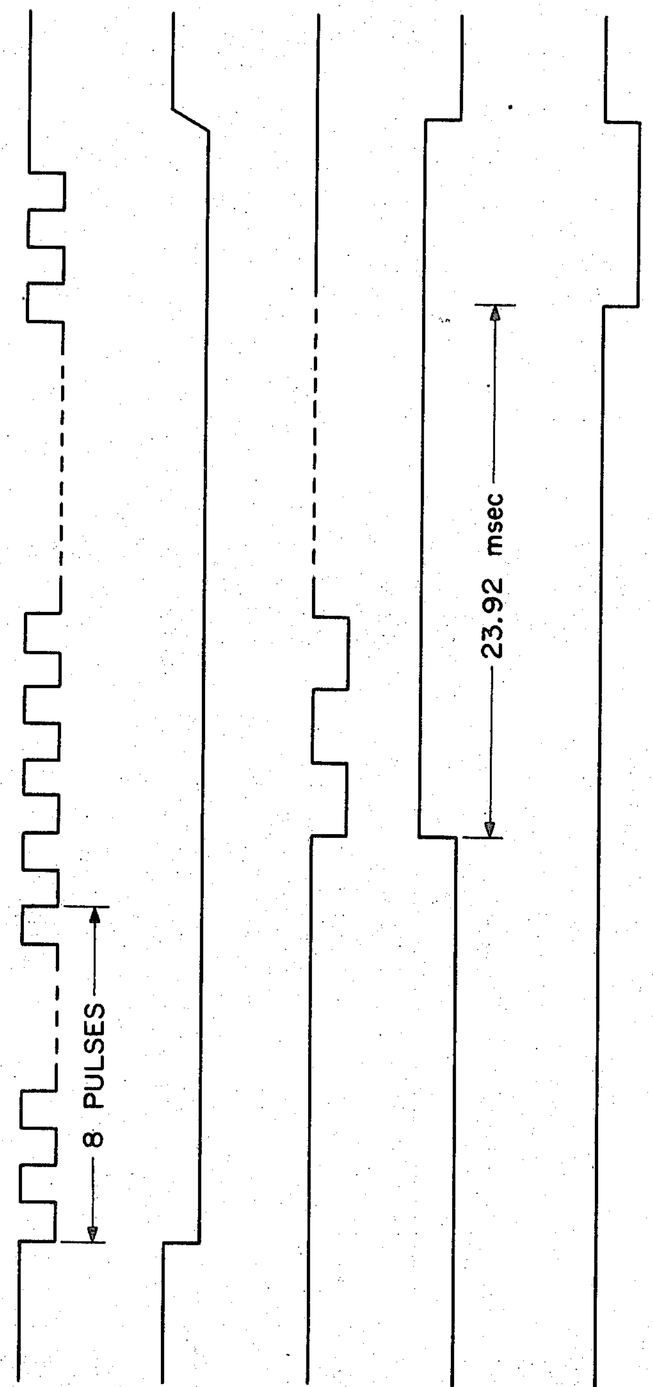

Using a pulse shaper, that is the Schmitt trigger 20, the output signal from the low pass filter 10 is converted to a square-wave signal, similar to that illustrated in FIG. 2*a*. The square-wave signal is fed simultaneously to counter 30, via NAND gate 22, and to the monostable 21 to change its output from logic 1 to logic 0. The output of the monostable 21 will stay at logic 0 as long as the input pulse period is less than the period of the monostable 21, for example as shown in FIG. 2*b*. The main function of the monostable is to reset the counter 30 to logic 0 when no input signal or an obviously invalid input signal is being received.

It has been found economically practical to provide the low and high pass filters 10 and 11 with an attenuation of about 40 decibels per octave beyond their respective cut-off frequencies. Hence the high group circuit 3 may from time to time receive signals of a frequency lower than that permissible. Thus the monostable multivibrator 21 is duplicated in the high group circuit 3, but having a shorter period than the monostable multivibrator 21 in the low group circuit 2 to prevent response to lower than permissible frequencies. This may at first appear illogical as one would normally expect that some means should be provided in the high group circuit for guarding against an invalid response to frequencies above those as listed in Table D. However, it has been determined experimentally that in a telephone signalling application the presently disclosed embodiment with similar monostable multivibrators in the low and high group circuits 2 and 3, provides a significant and satisfactory immunity to invalid signals.

Since the signalling frequency signals generated by a telephone set during the initial few milliseconds, i.e. transient time, are inconsistant, it is necessary to delay the initiation of the generation of the timing signal by a time equal to or more than the transient time. A timing circuit wich consists of the counter 45, the register 40, the gates 43 and 36 and the 557.2 KHz crystal oscillator 44 is used to generate the timing signal. Experimentally, it was found that after the first eight pulses, in the case of the low frequency group, and after the first 21 pulses, in the case of the high frequency group, the respective signalling frequencies have stabilized. These additional counts are not included in Tables C and D. On count 9, binary code 1001, the counter 30 output enables the NAND gate 32 to change its output state from logic 1 to logic 0 as illustrated in FIG. 2*c*. This in turn alters the output of the NAND gate 41 in the register 40 from logic 0 to logic 1, thereby setting the register 40 as illustrated in FIG. 2*d*. Thus a 557.2 KHz frequency signal, generated by the oscillator 44, is fed to and counted by the counter 45. The register 40 maintains a logic 1 even after the output of the NAND gate 32 switches back to logic 1 when the counter 30 counts from 9 to 10. The counter 45 continues to count the signal fed from the oscillator 44, under the control of the NAND gate 43, until all the outputs $2^4$, $2^{10}$, $2^{12}$ and $2^{13}$ change their states to logic 1, i.e. at count member 13,328. This provides a time interval of 13,328/557.2 KHz = 23.92 msec. The outputs of the counter 45 thus cause the NAND gate 46 to change its output state from logic 1 to logic 0, as illustrated in FIG. 2*e*. The logic 0 output from the NAND gate 46 inhibits the NAND gate 43 and thereby stops the counter 45 from counting. It also inhibits the NAND gate 22 via the NAND gate 24 and thereby stops the counter 30 from counting, where if the counter 30 has reached either count 25, 27, 29 or 31, (i.e. the number of counts indicated in Table C plus 9) the outputs 1, 8 and 16 of the counter 30 are at logic 1. (In the case of the high frequency groups the counts are those indicated in Table D plus 22, yielding totals of 40, 42 and 44, and the outputs 1, 8, 16 and 32 of the counter 3, corresponding to the counter 30, are at logic 1.) If this condition is met, the output state of the NAND gate 31 is altered to logic 0 providing an enable signal on the low enable lead 4. When both high and low group enable signals are received at the input of the NOR gate 8, an output is provided to enable the decoder 9. The decoder 9 decodes the outputs 2 and 4 from the counter 30 in both low and high group circuits 2 and 3 to determine which frequencies have been received.

Table E illustrates counter and enable outputs over a range of lower group counts. The count numbers here each differ from the counts in Table C by an additional 9 counts which occur prior to the generation of the timing interval.

TABLE E

| Count No. | Outputs of the Counter 30 | | | | | Enable Output Provided | Input Frequency Signal |
|---|---|---|---|---|---|---|---|
| | 16 | 8 | 4 | 2 | 1 | | |
| 24 | 1 | 1 | 0 | 0 | 0 | No | |
| 25 | 1 | 1 | 0 | 0 | 1 | Yes | 668.84 to 710.64 Hz |
| 26 | 1 | 1 | 0 | 1 | 0 | No | |
| 27 | 1 | 1 | 0 | 1 | 1 | Yes | 752.45 to 794.25 Hz |
| 28 | 1 | 1 | 1 | 0 | 0 | No | |
| 29 | 1 | 1 | 1 | 0 | 1 | Yes | 836.05 to 877.85 Hz |
| 30 | 1 | 1 | 1 | 1 | 0 | No | |
| 31 | 1 | 1 | 1 | 1 | 1 | Yes | 919.66 to 961.46 Hz |
| 32 | 0 | 0 | 0 | 0 | 0 | No | |

Because an inhibit signal is applied to the NAND gate 22 the outputs 2 and 4 of the counter 30 are maintained as long as an incoming frequency signal is present. When the input signal to the monostable 21 disappears, its output returns to logic 1 and the following events take place: the counter 30 is reset; the register 40 is reset with the output of the NAND gate 41 being logic 0; and the counter 45 is reset by the output of the NAND gate 42. Since the outputs of the counter 30 and the output of the NAND gate 24 have changed to logic 0, the output of NAND gate 31 changes to logic 1 which in turn disables the NOR gate 8. The circuit has now returned to a quiescent state.

In another well known system of multiple frequency (MF) signalling in which eight different signalling frequencies, having a ±2.5% tolerance, are used, the above-described low and high group circuits can in modified form be utilized for signal frequency identification. In this case the signalling frequencies are split into four groups and four group circuits are used with altered timing signals. The following Table F illustrates one arrangement for grouping the signalling frequencies and the periods of four suitable timing signals. The period required for the first group in Table F is equal to 19/679.13 = 27.977 msec. Suitable timing signal periods required for the remaining groups are calculated in like manner. These timing signal periods must obviously be shorter than the time allowed to identify a frequency signal so that the signalling information is not lost before it can be stored or otherwise utilized. Typically, 40 msec are allowed to detect signals in the North American Bell Telephone compatible telephone systems. Thus the first grouping in Table F is the most critical as there are only about seven counts permissible before the timing signal is initiated. In this group, seven counts plus the timing interval leaves about 2 msec of the total 40 msec for decoding and storage or utilization of the detected signalling frequency. It is fortunate, however, that in practice the lower signalling frequency signals require fewer cycles to satisfactorily stabilize than do the higher signalling frequency signals. In each of the remaining groups the respective timing intervals are initiated each after a sufficient number of counts to place the termination of all the timing intervals in approximate time coincidence. Thus there is ample time for stabilization, and decoding for each group only occurs during the last about 2 msec of the mimimum valid signal duration. Obviously invalid signalling, that is where one of a pair of signals is of a duration less than about 38 msec, is not detected.

TABLE F

| Count | Detected Frequency ±2.5% | Time Interval |
|---|---|---|
| 19 | 697 Hz | 27.97 msec |
| 21 | 770 Hz | 27.97 msec |
| 19 | 852 Hz | 23.888 msec |
| 21 | 941 Hz | 23.888 msec |
| 19 | 1209 Hz | 16.103 msec |
| 21 | 1336 Hz | 16.103 msec |
| 18 | 1477 Hz | 12.533 msec |
| 20 | 1633 Hz | 12.533 msec |

What is claimed is:

1. A method for identifying, within predetermined frequency limits, a signal selected from a family of signals having distinctly different predetermined frequencies, comprising the steps of:

a. counting each cycle of the signal, b. after a predetermined plurality of cycles have been counted, generating a timing signal having a selected time interval, c. terminating step (a) at the end of the time interval, d. identifying the signal according to the total count arrived at, in step (a), when the total count falls within one of a plurality of permissible count ranges in a series of counts ranges.

2. A method as defined in claim 1 comprising the further step of:

inhibiting steps (a) to (d) in the presence of a signal having a period which exceeds a predetermined time.

3. A method for identifying, within predetermined frequency limits, a pair of lower and upper signalling frequency signals received from a telephone transmission facility wherein the lower signalling frequency signal is one of a predetermined plurality of frequency signals in a lower group of frequency signals and the upper signalling frequency signal is one of a predetermined plurality of frequency signals in an upper group of frequency signals, comprising the steps of:

a. filtering the lower and upper signalling frequency signals to separate the lower signal from the upper signal and directing the lower and upper signals to lower and upper group identifying circuits respectively, b. in the lower group identifying circuit, counting the cycles of the lower signal, and likewise in the upper group identifying circuit, counting the cycles of the upper signal, c. after a predetermined plurality of cycles of the lower signal have been counted, generating a first timing signal having a first time interval and likewise, after a predetermined plurality of cycles of the upper signal have been counted, generating a second timing signal having a second time interval, d. terminating step (b) in the lower and upper group identifying circuits, at the ends of the first and second time intervals respectively, e. in the continuing presence of signalling frequency signals translating the respective counts so that said lower and upper signalling frequency signals are identified.

4. An electronic circuit for identifying, within predetermined frequency limits, a signal selected from a family of signals having distinctly different predetermined frequencies, comprising:

counting means for counting each cycle of the signal, timing means for generating a timing signal having a time interval, after a predetermined plurality of cycles have been counted by said counting means, said timing means including means for inhibiting said counting means at the end of said time interval, decoding means for decoding the output of the counting means so that the frequency of the signal is identified as being within said limits when the counted total of cycles falls within one of a plurality of permissible count ranges in a series of count ranges.

5. An electronic circuit as defined in claim 4 further comprising:

reset means for resetting the counting means and the timing means in the absence of the signals having cycles of less than a predetermined duration of time.

6. An electronic circuit for idenfitying, within predetermined frequency limits, a pair of lower and upper signalling frequency signals received from a telephone transmission facility, wherein the lower signalling frequency signal is one of a predetermined plurality of signals in a lower frequency group and the upper signalling frequency signal is one of a predetermined plurality of signals in an upper frequency group, comprising:

filtering means for segregating the lower and upper signalling frequency signals, one from the other, a lower group counting means for counting the cycles of the lower signal for storing the resultant count on receiving a first inhibit signal and for resetting to a 0 output on receiving a reset signal, a first timing means for generating a first timing signal having a first time interval in response to a predetermined plurality of cycles of the lower signal being counted, and for providing the first inhibit signal at the end of the first time interval, a first reset means for resetting the lower group counting means and the first timings means in the absence of a lower signal having cycles of less than a first predetermined duration of time, an upper group counting means for counting the cycles of the upper signal, for storing the resultant count on receiving a second inhibit signal, and for resetting to a 0 count on receiving a second reset signal, a second timing means for generating a second timing signal having a second time interval, in response to a predetermined plurality of cycles of the upper signal being counted and for providing the second inhibit signal at the end of the second time interval, a second reset means for resetting the upper group counting means and the second timing means in the absence of an upper signal having cycles of less than a second predetermined period of time, decoding means for identifying said lower and upper signalling frequencies according to a translation of the respective counts associated therewith, after the first and second time intervals and in the continuance of lower and upper signals being received by the lower and upper group identifying circuits.

* * * * *